US009567033B2

(12) United States Patent
Göring

(10) Patent No.: US 9,567,033 B2
(45) Date of Patent: Feb. 14, 2017

(54) ROTOR SYSTEM FOR A BICYCLE

(71) Applicant: Wolfgang Göring, Karlsruhe (DE)

(72) Inventor: Thomas Göring, Karlsruhe (DE)

(73) Assignee: Wolfgang Göring, Karlsruhe (DE), part interest ( * ) Notice: Subject to any disclaimer, the term of this patent is extended or adjusted under 35 U.S.C. 154(b) by 0 days.

(21) Appl. No.: 14/395,673

(22) PCT Filed: Feb. 13, 2013

(86) PCT No.: PCT/EP2013/052900
§ 371 (c)(1),
(2) Date: Oct. 20, 2014

(87) PCT Pub. No.: WO2013/156175
PCT Pub. Date: Oct. 24, 2013

(65) Prior Publication Data

US 2015/0128753 A1 May 14, 2015

(30) Foreign Application Priority Data

Apr. 20, 2012 (DE) ........................ 10 2012 103 465
Nov. 21, 2012 (DE) ........................ 10 2012 111 204

(51) Int. Cl.
*B62K 21/06* (2006.01)
*B62L 3/02* (2006.01)
(Continued)

(52) U.S. Cl.
CPC .................. *B62L 3/02* (2013.01); *B62K 19/32* (2013.01); *B62K 21/00* (2013.01); *B62K 21/06* (2013.01);
(Continued)

(58) Field of Classification Search
CPC ........... B62D 5/0454; B62D 5/04; B62L 3/02; B62K 23/00; B62K 21/06; B62K 21/18; B62K 19/32
See application file for complete search history.

(56) References Cited

U.S. PATENT DOCUMENTS 2,649,942 A * 8/1953 Hood .................... B60B 27/023 192/217.3
3,675,740 A * 7/1972 Frei ........................... B62L 3/02 188/26
(Continued)

FOREIGN PATENT DOCUMENTS

DE 199 29 093 A1 1/2001
DE 199 29 093 C2 10/2002
(Continued)

*Primary Examiner* — Joseph Rocca
*Assistant Examiner* — Gabriela C Craciun
(74) *Attorney, Agent, or Firm* — McGlew and Tuttle, P.C.

(57) ABSTRACT

A rotor system for a bicycle (1), for the purpose of bearing a fork (8) and transmitting the actuations of Bowden cables (31, 32), which each having a core (31*a;* 32*a*) includes first and second transmission elements (36, 37), that rotate relative to one another and are arranged in the area of the bearing (21, 23, 25) of the fork (8). The transmission elements include an annular region, mounted on a fork steerer (12) and surrounded by a head tube (21), and connection areas (36*b;* 37*b*) for the direct or indirect attachment of the rotor-side ends of the cores (31*a* 32*a*). At least one of the transmission elements (37) includes a connection area (37*b*) with a connecting element, which (32*b*) can be form-fittingly attached, interacting with, or being integrally connected to, the rotor side end of the core (32*a*) that is assigned with said at least one transmission elements (37).

20 Claims, 9 Drawing Sheets

(51) Int. Cl.

| | |
|---|---|
| ***B62K 19/32*** | (2006.01) |
| ***B62K 21/00*** | (2006.01) |
| ***B62K 21/18*** | (2006.01) |
| ***F16C 1/10*** | (2006.01) |
| *B62J 99/00* | (2009.01) |

(52) U.S. Cl.
CPC ............... *B62K 21/18* (2013.01); *F16C 1/101* (2013.01); *B62J 2099/0046* (2013.01); *Y10T 74/20462* (2015.01)

(56) References Cited

U.S. PATENT DOCUMENTS

| | | | | | |
|---|---|---|---|---|---|
| 4,653,768 | A * | 3/1987 | Keys | B62L 1/12 | 188/24.22 |
| 5,479,776 | A * | 1/1996 | Romano | B62K 23/06 | 192/217 |
| 5,605,076 | A * | 2/1997 | Wu | B62K 21/18 | 280/279 |
| 5,791,671 | A * | 8/1998 | Tang | B62K 21/18 | 280/264 |
| 5,899,479 | A * | 5/1999 | Schroder | B62J 1/06 | 280/283 |
| 6,085,611 | A * | 7/2000 | Valdez | B62L 1/00 | 74/501.6 |
| 6,224,079 | B1 * | 5/2001 | Goring | B62K 21/06 | 280/279 |
| 7,204,349 | B2 * | 4/2007 | Goring | B62M 25/02 | 188/24.11 |
| 7,757,820 | B1 * | 7/2010 | Wu | B62K 21/18 | 188/24.11 |
| 7,810,614 | B1 * | 10/2010 | Li | B60T 11/046 | 188/2 D |
| 9,174,695 | B1 * | 11/2015 | Wang | B62K 21/18 | |
| 2004/0112166 | A1 * | 6/2004 | Richardson | B60T 11/046 | 74/500.5 |
| 2004/0112685 | A1 * | 6/2004 | Cotsonas | B60T 11/043 | 188/2 D |
| 2005/0098979 | A1 * | 5/2005 | Horiuchi | B62K 19/32 | 280/279 |
| 2005/0115777 | A1 * | 6/2005 | Goring | B62M 25/02 | 188/24.11 |
| 2005/0166701 | A1 * | 8/2005 | Mossler | E05B 85/12 | 74/502.4 |
| 2007/0012137 | A1 * | 1/2007 | Dal Pra’ | B62K 23/06 | 74/502.2 |
| 2009/0031846 | A1 * | 2/2009 | Dal Pra’ | B62K 23/06 | 74/502.2 |
| 2010/0180713 | A1 * | 7/2010 | Tseng | B62K 21/16 | 74/493 |
| 2013/0076000 | A1 * | 3/2013 | Man | B62K 21/18 | 280/279 |
| 2013/0175782 | A1 * | 7/2013 | Matthews | B62K 19/32 | 280/279 |
| 2013/0292213 | A1 * | 11/2013 | Coombes | B62L 3/04 | 188/24.11 |
| 2015/0151811 | A1 * | 6/2015 | Riley | B62L 3/08 | 188/17 |

FOREIGN PATENT DOCUMENTS

| | | | |
|---|---|---|---|
| DE | 20 2004 017 094 | U1 | 2/2005 |
| FR | 571 408 | A | 5/1924 |
| WO | 2012/005610 | A2 | 1/2012 |

* cited by examiner

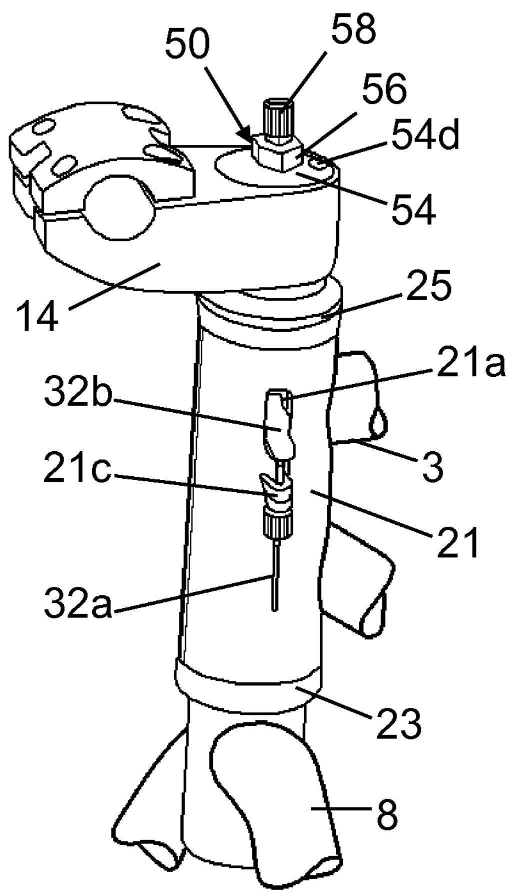
Fig. 5A
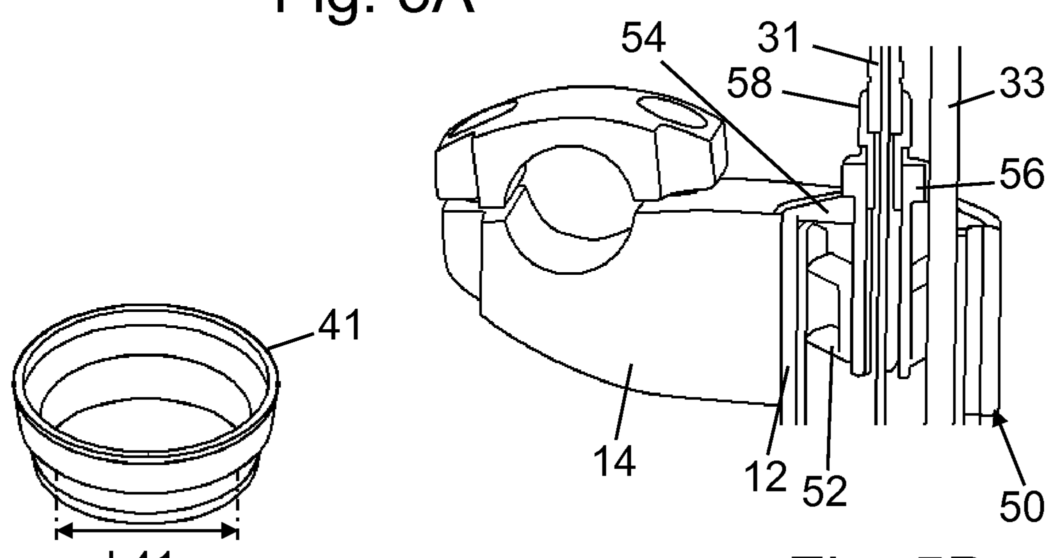
Fig. 5B
Fig. 5C

ROTOR SYSTEM FOR A BICYCLE

CROSS REFERENCE TO RELATED APPLICATIONS

This application is a U.S. National Phase Application of International Application PCT/EP2013/052900 filed Feb. 13, 2013 and claims the benefit of priority under 35 U.S.C. §119 of German Patent Applications DE 10 2012 103 465.6 filed Apr. 20, 2012 and DE 10 2012 111 204.5 filed Nov. 21, 2012, the entire contents of which are incorporated herein by reference.

FIELD OF THE INVENTION

The invention relates to a rotor system for a bicycle for the bearing of a fork and for the transmission of actuations of Bowden cables each having a core, with at least a first and a second transmission element which are rotatable relative to one another and which are arranged in the area of the bearing of the fork.

BACKGROUND OF THE INVENTION

From the DE 199 29 093 C2 a rotor system for a bicycle for bearing, rotatably by 360°, a fork and for the transmission of actuations of brake cables is known, with a rotor unit, arranged in the area of the bearing of the fork, which is movable on the whole relatively to the fork in axial direction and which comprises at least two transmission elements that are rotatable relative to one another, wherein the transmission elements at least in radial direction are surrounded by a housing.

Another rotor system, which also makes possible a 360° turn of the fork, is known from WO 2012/005610 A2. A first Bowden control cable is guided from the handlebar into the fork steerer. At the end of its core a bar is fixed, which protrudes out of the fork steerer through fork steerer openings, where it is taken up by the first transmission element. The arrangement of the core of the second Bowden cable leading to the back wheel at the upper ring-shaped second transmission element is done by means of a fixture bent at a right angle screwed onto the transmission element, in whose radially outwards extending area, which is provided with a slotted receiving opening for introducing the core, the thickened end of the core is suspended. At the housing a comparable overturned brake arm is screwed, which with its area extending outwards in radial direction, that is formed according to the above mentioned fixture, adheres to the first fixture from the bottom and supports it. This kind of arrangement also corresponds to the technical realization of DE 199 29 093 C2, in which the arrangement of the cores of the Bowden mechanisms serving as brake cables is only illustrated schematically.

In FR 571 408 a transmission mechanism is known, which uses bars and levers. In the stem a crank is mounted, at which a bar introduced into the fork steerer is articulated, which in the area of the lower end carries a bar that protrudes out of the fork steerer through fork steerer openings. A first transmission element sits on the bar. The second transmission element is formed bifurcated, with the shaft articulated at the transition from the head tube to the lower tube and resting with the fork peaks on the first transmission element. At the shaft of the second transmission element a Bowden control cable is fixed, which is guided further through the lower tube. The transmission elements do not form a unit, but perform different movements when a braking is executed.

SUMMARY OF THE INVENTION

The present invention is based on an object of improving a rotor system of the abovementioned type. In particular, the Bowden cable arrangement is to be simplified and the total rotor system is to be more economical to produce.

A bicycle, which is particularly designed as a BMX freestyle bicycle, comprises a rotor system according to the invention in order to avoid a twisting of the Bowden mechanisms serving as brake cables and in order to be able to actuate the rear wheel brake at any time. The bicycle, in particular when it is designed as a mountain bike, also can have a rotor system according to the invention for those Bowden cables, which serve as gear cables, in order to be able to operate the gear change at any time.

The two transmission elements form the essential components of a rotor unit of the rotor system according to the invention. A first Bowden cable of the provided Bowden cables is guided from the handlebar to the rotor unit and is in operative connection with the first transmission element. With the second transmission element, another Bowden cable of the provided Bowden cables is in operative connection, which is guided from the rotor unit to the rear wheel of the bicycle, in particular to a rear wheel brake or to a gear change. The two transmission elements cooperate in axial direction in order to transmit the actuation of the Bowden cables (more precisely that of the first Bowden cable on the second Bowden cable). The fork steerer defines the axial direction. For the direct or indirect arrangement of the cores of the Bowden cables at the transmission elements, the latter each comprise connection areas. The term “indirect” is to indicate the use of a separately formed and detachably mounted intermediate element, the term “direct” the absence of such an intermediate element. The term “detachable” is to indicate a separation possibility without destruction.

The connection area according to the invention in case of at least one of the transmission elements (preferably of the second transmission element) is arranged completely or almost completely inside the head tube (I. e. radially inside the head tube), thus does not protrude radially outwards, which facilitates the assembly. The fork steerer defines the radial direction. At this connection area a connecting element is form-fittingly attachable, the connecting element at least in axial direction directly interacting with the connection area. On the other hand, the connecting element cooperates with the rotor side end of the respective core (preferably of the second Bowden cable) detachably (and is formed separate from said end) or is connected in one piece with said end. This arrangement provides a simple, fast possibility of attaching the core at the transmission element. A tool, which hitherto was necessary for screwing the support of the end of the core, is no more necessary. Moreover, by the elimination of the screw, the number of parts can be reduced. Preferably, the connecting element at least partially embeds the rotor side end of the respective core. The end of the core can then be stretched (instead of forming a loop). In particular preferably the connecting element is molded directly at the core end, or cast onto it, or pressed onto it, or connected in one piece in another way, so that the number of parts can be further reduced.

For the attachment at the connection area, the connecting element may have a jut (guiding), which interacts with a guide groove of the second transmission element extending parallelly to the axis of the fork steerer (i.e. in axial direction). This jut of the connecting element can be for example cuboid or dovetailed. Alternatively, the connecting element comprises two juts, which under elastic deformation engage like a clip in undercut areas of the transmission element in the connection area, in which for the engagement an elastic deformation of the connecting element is provided. By the clipping a simple assembly is possible. One of the two juts preferably extends parallelly to the fork steerer axis and, from a front part of the transmission element, engages into a corresponding opening. The second of the juts is preferably, but not necessarily, perpendicular to it and engages in radial direction into a corresponding opening or deepening of the transmission element.

The two transmission elements have as basic form a cylinder ring, i.e. a sleeve, which allows a simple mounting. The two transmission elements can be arranged in alignment with each other (in axial direction in alignment with each other, i.e. axially one after the other) on the fork steerer, which requires the smallest radial installation space. However, they can also be concentric to one another (in radial direction concentric to one another, i.e. radially one inside another), i.e. the second transmission element—at least sectionally with respect to its axial extension—embeds the first transmission element (or vice versa), which allows a simple and defined mounting of the two transmission elements in relation to each other. The preferred mounting is a combination thereof, i.e. partially flush and partially concentric. For this purpose, the two transmission elements preferably comprise steps, by means of which they lie on top of each other. For all the mountings, there is a direct contact between the two transmission elements, preferably a sliding contact, for which purpose both transmission elements are preferably plastic injection molded parts. An intermediate ring, as it is used in the state of the art, can be omitted, so that the number of parts can be further reduced. With the same purpose preferably the connection area is formed one-piece on the second transmission element.

Preferably, the core of the first Bowden cable is introduced from the handlebar into the fork steerer, which exploits the already present installation space and saves installation space between fork steerer and head tube, thus allowing a particularly slim embodiment of the head tube. For the attachment of the core of the first Bowden cable at the first transmission element, preferably a bar is provided, which is mounted on the core, in the mounted state for example lies on a nipple or similar at the end of the core, and for the assembly is preferably tiltable relatively to the core. The bar protrudes through oblong-hole-formed fork steerer openings in radial direction out of the fork steerer (beyond the outside extension of the fork steerer), so that the first transmission element, which is mounted outside on the fork steerer, can be connected with the bar, for example set or pressed on it. Accordingly, the bar is introduced with its ends in seats, in particular openings or grooves, in order to cooperate form-fittingly and if necessary in force-locking manner with the first transmission element. For a connection with a (small) force-locking contribution the bar may engage into the first transmission element, for which purpose the bar (or the transmission element) comprises suitable catch noses, for example frontally.

The first Bowden cable with bar according to the invention and the second Bowden cable with connecting element according to the invention are preassembled components and can be sold separated from the bicycle or from the rotor unit as spare-parts or together with the rotor unit as kit of the rotor system.

In order to guide the core of the second Bowden cable, which by means of the connecting element is applied at the connection area of the second transmission element, to the rear wheel, the head tube, which bears the fork by means of headsets, has a—preferably oblong-hole-formed—head tube opening, by which the connecting element from the outside can engage into the head tube for the connection area at the second transmission element.

Preferably a third Bowden cable is provided, which is guided from the handlebar to the front wheel to a front brake. In order to guide, apart from the first Bowden cable, also this third Bowden cable through the fork steerer, the fixing device, which is provided for fastening the stem at the fork steerer, is modified accordingly. In the respective cap and the star grip nut placed in the fork steerer, or alternatively in the fixing screw to be screwed into the fork steerer, two openings or passages are provided, I. e. apart from the central passage known per se also an eccentric passage. Compared to an enlarged central passage, this conformation has the advantage that the seat of the star grip nut in the fork steerer is not weakened. The first Bowden cable, more precisely its core, is then introduced through the central passage, in order to catch if possible centrally at the bar. The third Bowden cable guided to the front brake is guided through the eccentric passage offset as to the known central passage.

In the following, the invention is explained more in detail on the basis of several embodiments represented in the drawing. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 5A is a perspective view in the area of the bearing of the fork with a rotor unit;

FIG. 5B is a section view of a fixing device of FIG. 5A;

FIG. 5C is a perspective view of a bearing cup;

DESCRIPTION OF THE PREFERRED EMBODIMENTS

Figure 1:
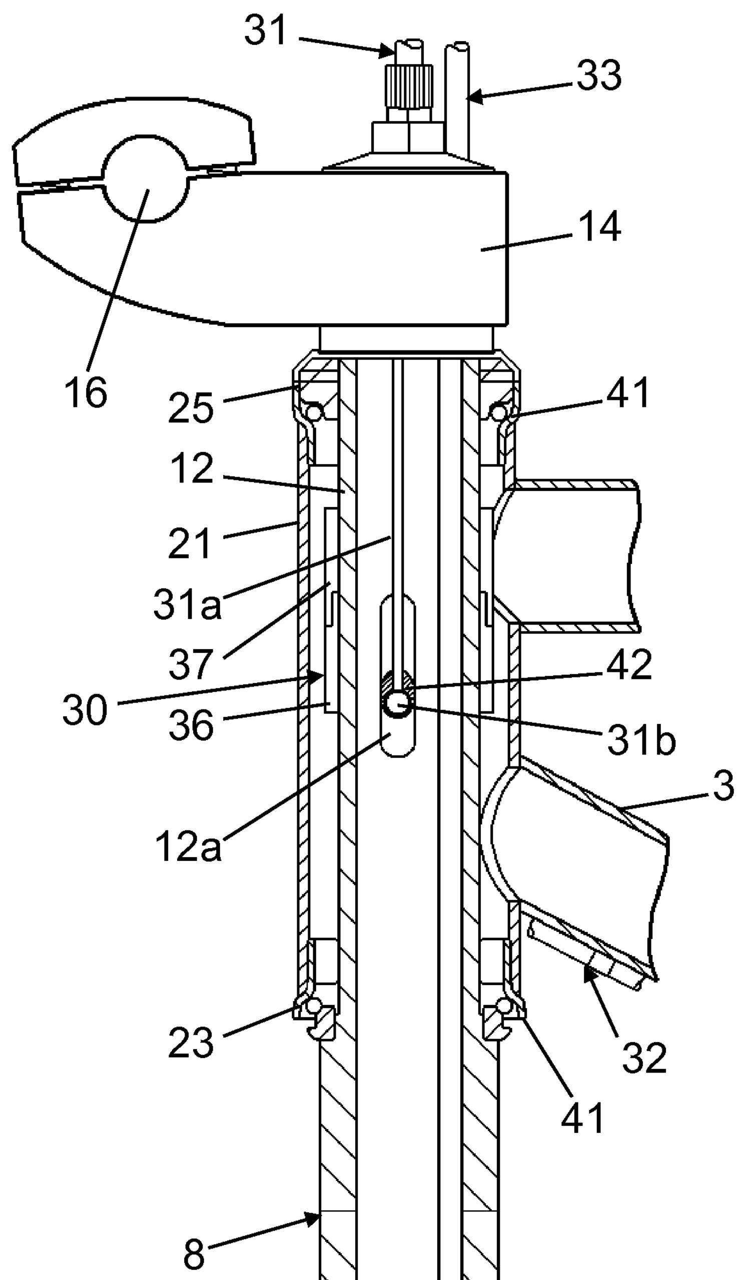
FIG. 1 is a partially cut side view in the area of the bearing of the fork with a rotor unit according to a first embodiment.
Figure 2A:
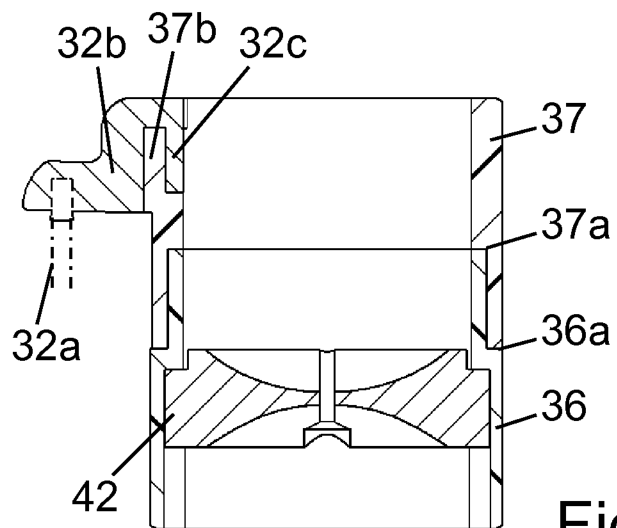
FIG. 2A is a section view of transmission elements, connecting element and bar according to the first embodiment.
Figure 2B:
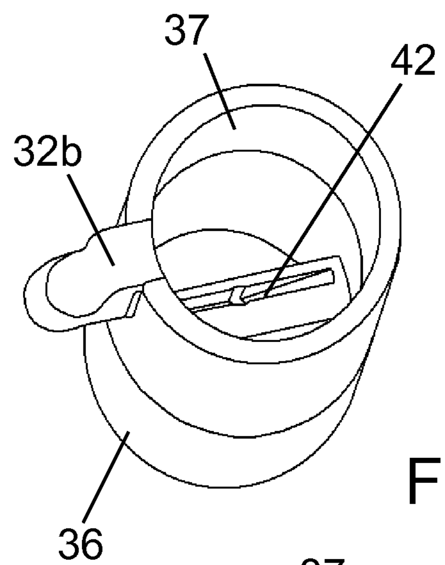
FIG. 2B is a perspective view of the construction group of FIG. 2A from the top.
Figure 2C:
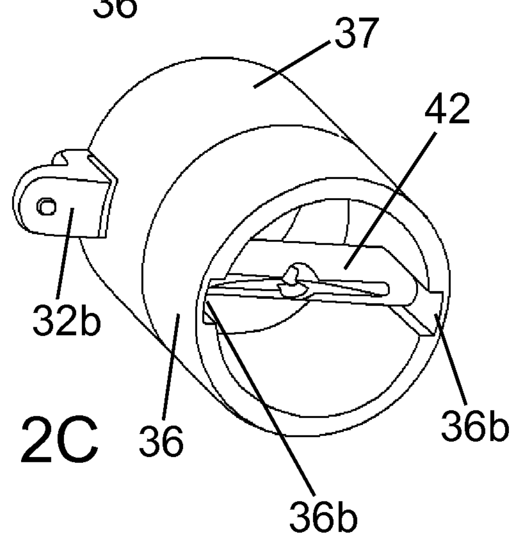
FIG. 2C is a perspective view of the construction group of FIG. 2A from the bottom.
Figure 2D:
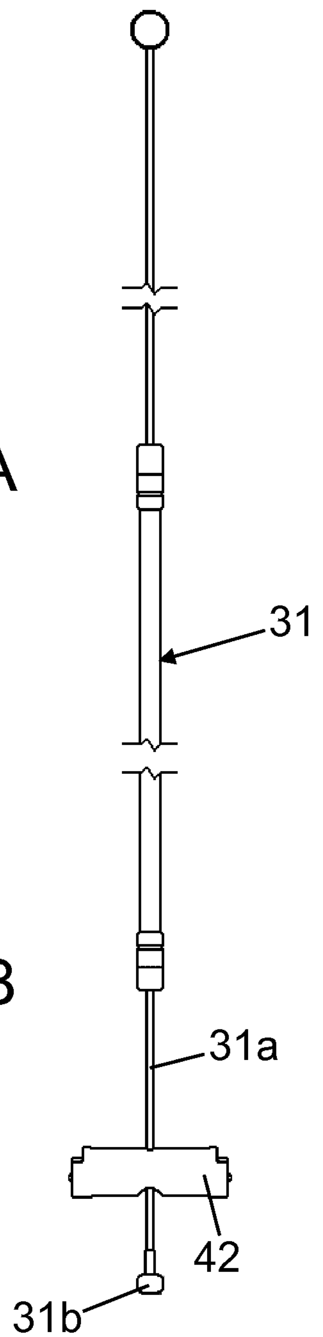
FIG. 2D is a first Bowden cable.
Figure 3A:
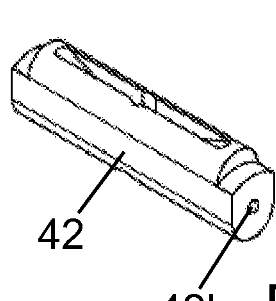
FIG. 3A is a perspective view of a bar.
Figure 3B:
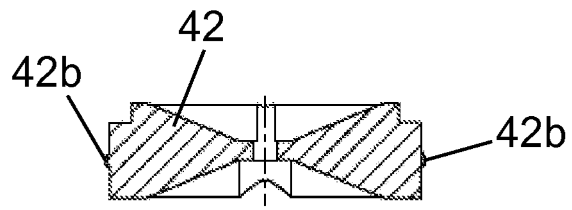
FIG. 3B is a section view of the bar of FIG. 3A.
Figure 3C:
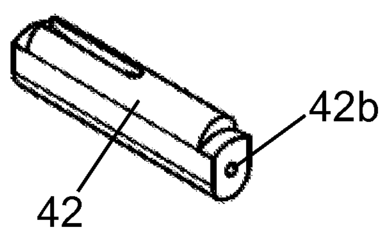
FIG. 3C is a perspective view of a modified bar.
Figure 3D:
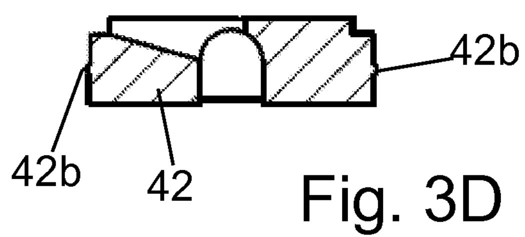
FIG. 3D is a section view of the modified bar of FIG. 3C.
Figure 3E:
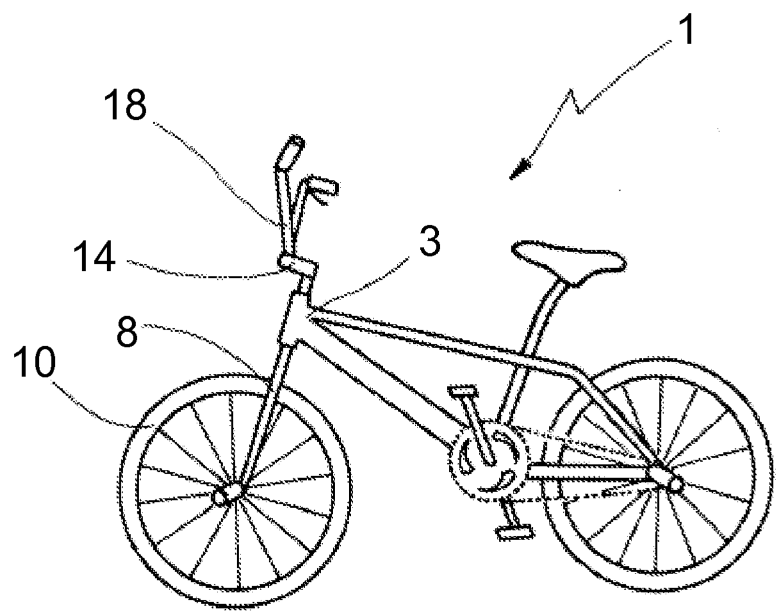
FIG. 3E is a side view of a bicycle according to the invention.

Referring to the drawings in particular, a bicycle 1 indicated as a whole with 1, which is designed as a BMX freestyle bicycle, comprises a frame 3 that at its rear end bears the rear wheel 5 of the bicycle 1. At the front end of the frame 3, a fork 8 is rotatably beared. At its lower end, the fork 8 bears the front wheel 10 of the bicycle 1. On a fork steerer 12 forming the upper end of the fork 8 a stem 14 is fixed. The stem 14 comprises a horizontally extending handlebar seat 16, which embeds the handlebar 18 of the bicycle 1. The fork steerer 12 with its circular cylindrical symmetry defines the directions used in the following.

For bearing the fork 8, the frame 3 has a generally circular cylindrical head tube 21 open on both faces, which is generally vertically oriented. The fork steerer 12 extending in axial direction is arranged, over a part of its length, inside the head tube 21 concentric with it. A lower headset 23 and a upper headset 25 consist of several components and can be twisted in themselves, each being mounted outside at the lower or upper end of the head tube 21 and inside on the fork 8 or its fork steerer 12.

A rotor unit 30 described more in detail in the following is arranged inside the head tube 21 between the upper headset 23 and the lower headset 21. The rotor unit 30 is displaceable by sliding in axial direction on the fork steerer 12. An upper, first Bowden cable 31 is guided from a brake lever, merely suggested in the drawing, at the handlebar 18 to the rotor unit 30, from which a lower, second Bowden cable 32 is guided along the frame 3 to a rear wheel brake at the rear wheel 5 not represented in the drawing. Accordingly, the first Bowden cable 31 (i. e. its core 31*a*) comprises a handlebar side end and a rotor side end and the second Bowden cable 32 (i. e. its core 32*a*) a rotor side end and a brake side end. A third Bowden cable 33 is guided from a further brake lever at the handlebar 18 through the fork steerer 12 to a front brake at the front wheel 10 not represented in the drawing. The rotor unit 30 and further components for bearing or for power transmission, preferably the first Bowden cable 31 and/or the second Bowden cable 32, and the headsets 23 and 25 if appropriate, define a rotor system.

The rotor unit 30 comprises a first transmission element 36, which is mounted rotatably and displaceably on the fork steerer 12, and a second transmission element 37. The first transmission element 36 comprises for its mounting on the fork steerer 12 an—at least approximately—ring-shaped area. Preferably, both transmission elements 36 and 37 are manufactured as injection molded parts in a resilient plastic material, in metal or in an appropriate compound material. The two transmission elements 36 and 37 are mounted rotatably relative to one another and arranged concentrically with the fork steerer 12. With respect to a movement along the fork steerer 12, the two transmission elements 36, 37 are coupled for entrainment: when the first transmission element 36 moves upwards along the fork steerer 12, it entrains the second transmission element 37, and when the second transmission element 37 moves upwards along the fork steerer 12, it entrains the first transmission element 36.

The core 31*a* of the first Bowden cable 31 is at the rotor side in operative connection with the first transmission element 36, whereas the core 32*a* of the second Bowden cable 32 is at the rotor side in operative connection with the second transmission element 37. The sleeve of the second Bowden cable 32 is supported—at least indirectly—by the head tube 21, whereas the core 32*a* of the second Bowden cable 32 with its rotor side end is directly connected to a connecting element 32*b*.

In the present case, the connecting element 32*b* is an injection molded part of metal, however also an appropriately resilient plastic material or another compound material can be used. Moreover, the connecting element 32*b* can also be produced in another way, for example milled from a metal or forged. Preferably, the connecting element 32*b* is directly firmly connected to the core 32*a* of the second Bowden cable 32, in particular pressed with the rotor side end of the core 32*a*, or molded to it or cast or connected in one piece in another way. Alternatively, the connecting element 32*b* is a separate component (I. e. not one-piece with the core 32*a*), in which the core 32*a* for example is clipped, suspended or otherwise form-fittingly introduced or with which the core 32*a* interacts detachably in another way. For example, a barrel-formed, ball-formed or conical thickened nipple, provided at the rotor side end of the core 32*a*, can be suspended in the alternative connecting element 32*b*, the connecting element 32*b* incorporating it for example with a (upwards open) funnel that preferably is laterally slotted.

The connecting element 32*b* is (in all embodiments) directly form-fittingly attachable at a connection area 37*b* of the second transmission element 37, in an aid-free way. For this purpose, the connecting element 32*b* is preferably hook-like and comprises a jut 32*c*, with which the connecting element 32*b* engages from above into an axial guide groove (or another undercut partition) of the connection area 37*b*. As shown in the drawing, the jut 32*c* can be cuboid or alternatively dovetailed and is introduced into an appropriately formed seat of the connection area 37*b*. By appropriate choice of the fit, the jut 32*c* can be kept purely form-fittingly, where applicable by appropriate excess also additionally in a force-locking manner. The connection area 37*b* preferably protrudes radially outwards, in the fashion of an oriel, so that the hook-shaped connecting element 32*b* can be suspended without needing installation space radially inside the second transmission element 37. The connection area 37*b* can be formed alternatively as a simple groove (without oriel). In both cases, however, the connection area 37*b* is still arranged (completely) inside the head tube 21. Due to the stable tension load of the core 32*a*, which is given by a not represented spring of the rear wheel brake, a detachment of the connection during operation can be safely prevented. In case of a repair, however, a very simple, tool-free detachment of the connection is possible.

The connecting element 32*b* can be formed in various variants. For example, the suspension at the connection area 37*b* can be developed into a clipping, by providing apart from the jut 32*c* a further jut 32*d*, which is formed nub-like at the lower end of the connecting element 32*b* and protrudes radially inwards. This further jut 32*d* penetrates in an appropriate deepening in the connection area 37*b*, i.e. after an elastic deformation of the connecting element 32*b* the latter grasps the connection area 37*b* (at least partially form-fittingly), i.e. the connecting element 32*b* is secured like a clip on the second transmission element 37. In the drawing, both juts 32*c* and 32*d* of the connecting element 32*b* working as clip are formed nub-like, they can however have any type of suitable form which allows a safe engagement and hold in case of a tensile load of the core 32*a*.

By means of the rotor system, a brake actuation (I. e. an actuation of the brake lever for the rear wheel brake) is transmitted from the handlebar 18 to the rear wheel 5. The rotor unit 30 (with its both transmission elements 36 and 37 rotatable relative to one another) serves for power transmission from the first Bowden cable 31 to the second Bowden cable 32.

If the user of the bicycle 1 wants to perform a steering movement, he turns the fork 8 by means of the handlebar 18 and thus the front wheel 10. In this turning movement the fork steerer 12 and the first transmission element 36 are entrained. The second transmission element 37 remains together with the second Bowden cable 32 in the position that it has occupied relatively to the head tube 21 attached to the frame. A shift of the rotor unit 41 along the fork steerer 12 does not occur or only imperceptibly.

If the user of the bicycle 1 wants to brake with the rear wheel brake, he pulls, by means of the brake lever, the core 31*a* of the first Bowden cable 31 and with it the first transmission element 36. Thus the rotor unit 41 is moved upwards along the fork steerer 12 so that also the second transmission element 37 is pulled upwards. The second transmission element 37 pulls the core 32*a* of the second Bowden cable 32, by which the rear wheel brake is actuated. A braking with the front brake is done directly by means of the third Bowden cable 33.

Insofar, the embodiments are similar. There are differences in the mounting of the transmission elements 36 and 37 and the supply of the Bowden cables 31 and 32. Equal components and components with the same effect have the same reference signs.

In the first embodiment, the basic form of both transmission elements 36 and 37 is a cylinder ring (sleeve). The first transmission element 36 is mounted directly on the fork steerer 12 in a sliding way, preferably with small backlash. Due to the preferred formation in plastic material, a slidable coating can be dispensed with. The second transmission element 37 is mounted on the first transmission element 36. For this purpose, the first transmission element 36 has a radial first step protruding inwards 36*a*, on which the second transmission element 37 is placed by means of a suitable second step 37*a*. The two transmission elements 36, 37 thus are arranged, on the one hand, in axial alignment with each other (due to the areas of the steps extending radially) and at the same time, on the other hand, radially one inside another, i.e. concentrically with each other (due to the axially extending areas of the steps). From the fork steerer 12, the second transmission element 37 is radially distanced, i.e. the internal diameter of the second transmission element 37 is greater than the internal diameter of the first transmission element 36. In axial direction, the two transmission elements 36 and 37 are held together by the prestressing in the Bowden cables, in particular of the rear wheel brake.

The dimensions of the rotor unit 30 are selected in such a way that its axial length is greater than its diameter. The two headsets 23 and 25 each have a bearing cup 41 as the part (of normally three parts) that is to be connected to the head tube 21. The funnel-shaped bearing cup 41 takes up a ball bearing with a large end, whereas with the other tapered end is pressed into the head tube 21 (or otherwise firmly attached to it). The internal diameter L41 of the tapered end of the bearing cup 41, thus the internal diameter at the narrowest point of the bearing cup 41, amounts to L41=36.0 ±0.2 mm, which is slightly larger than in known bearing cups. In this way, the rotor unit 30 can be introduced into the head tube 21 (or if necessary removed from it), even if the bearing cups 41 of the headsets 23 and 25 are already in the head tube 21. The external diameter of the large end of the bearing cup 41, thus the external diameter at the largest point, amounts to 45.0 mm, which corresponds to that of known bearing cups. The wall thickness of the bearing cup 41 is generally 1.5 mm. Head tube 21 with integrated bearing cups 41 can also be used. The inner diameter of such a head tube 21 is preferably 36.5±0.2 mm.

For the connection of the first transmission element 36 with the first Bowden cable 31, a bar 42 is provided having an oblong form similar to a bolt and a cross-section that is definite as possible (i.e. not circular). In the present case, the cross-section corresponds to a rectangle with strongly rounded corners. On the first transmission element 36 on the radially inwardly facing side, two grooves are formed 36*b*, which face each other radially, extend over a part of the axial length of the second transmission element 36, and are accessible from the bottom. By means of these grooves 36*b*, the second transmission element 36 can receive the bar 42, which then extends in radial direction. Instead of the grooves 36*b*, other openings/seats may be provided, for example holes. Preferably, the bar 42 at each of its ends comprises a catch 42*a*, which, when introducing the bar 42 into the first transmission element 36, dig (engage) into the ground of the grooves 36*b*, so that the first transmission element 36 and the engaged bar 42 are connected to each other. Preferably, each groove 36*b* comprises a small cavity, which receives the assigned catch 42*a* for improving the engaging. On its upper side at both ends, the bar 42 can have a step so that it abuts at the end of the grooves 36*b* and slightly protrudes into the groove-free area of the first transmission element 31.

The bar 42 penetrates the fork steerer 12 at two fork steerer openings 12*a* radially opposite to each other, i.e. its length is greater than the external diameter of the fork steerer 12, and it protrudes in radial direction beyond the outer circumference of the fork steerer 12. The fork steerer openings 12*a* are designed as oblong holes, so that the bar 42 with the first transmission element 36, on the one hand, occupies a defined position in circumferential direction and follows a steering movement of the fork 8, and, on the other hand, does not obstruct a movement of the rotor unit 30 along the fork steerer 12 during a braking.

The bar 42 is mounted on the core 31*a* of the first Bowden cable 31 between the end of the core and the sleeve of the first Bowden cable 31. For this purpose, the bar 42 centrally has a channel for the passage of the core 31*a* of the first Bowden cable 31 and on the bottom a deepening for—preferably form-fitting—insertion of a nipple 31*b* at the end of the core 31*a* (or of an otherwise thickened end of the core 31*a*) of the first Bowden cable 31. On this nipple 31*b* the bar 42 is seated in the mounted state. Although the bar 42 and the core 31*a* of the first Bowden cable 31 are oriented orthogonally towards each other in the mounted state, the bar 42 is preferably tiltable relatively to the core 31*a*—for facilitating the assembly. For this purpose, the bar 42 comprises tilts that are oriented towards the channel, and during installation allow a tilting of the bar 42 relatively to the core 31*a* of the first Bowden cable 31. These tilts can be formed symmetric or unilateral and on the upper side and/or on the bottom of the bar 42. The drawing shows such alternatives.

The internal diameter of the head tube 21 is slightly greater than the external diameter of the transmission elements 36 and 37, so that in the head tube 21, a head tube opening 21*a* is provided, through which the connecting element 32*b* protrudes. More precisely, the second Bowden cable 32 is guided on the outer side of the head tube 21 up to the head tube opening 21*a*, through which the connecting element 32*b* protrudes and is connected with the second transmission element 37 inside the head tube 21.

The head tube opening 21*a* is designed as an oblong hole, so that the connecting element 32*b* with the second transmission element 37, on the one hand, occupies a defined position in circumferential direction and remains fixed during a steering movement of the fork 8, and, on the other hand, does not obstruct a movement of the rotor unit 30 along of the fork steerer 12 during a braking.

Figure 4B:
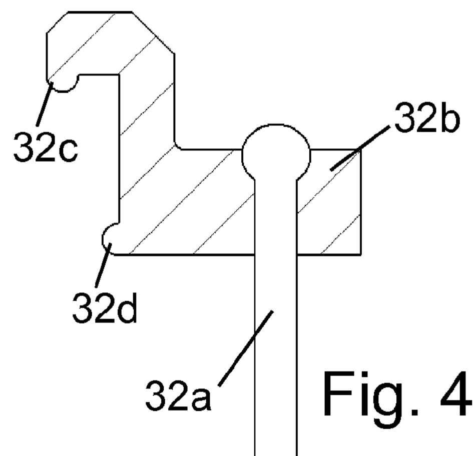
FIG. 4B is a schematic sectional view of the connecting element according to the second embodiment.
Figure 4A:
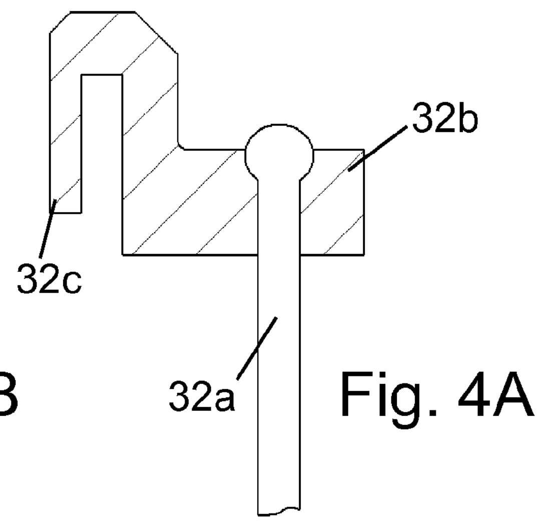
FIG. 4A is a schematic sectional view of the connecting element according to the first embodiment.
Figure 4C:
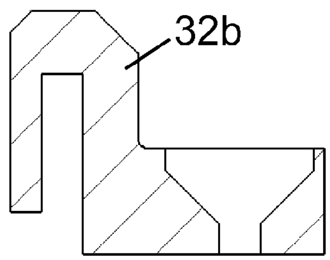
FIG. 4C is a schematic sectional view of a modified connecting element.
Figure 4C:
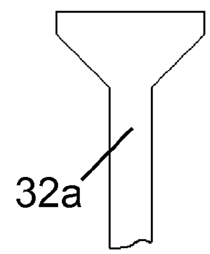
Figure 4D:
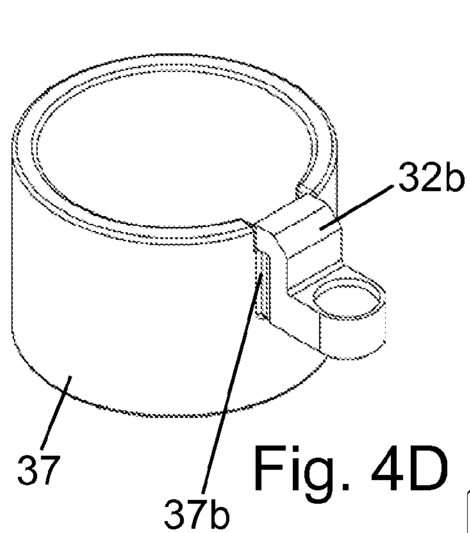
FIG. 4D is a perspective representation of the second transmission element with a connecting element according to FIG. 4C.
Figure 4E:
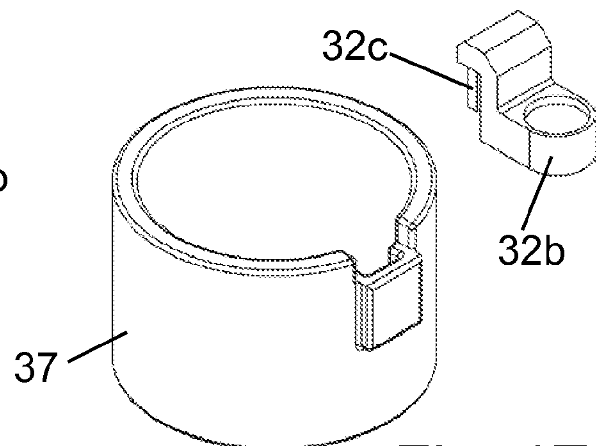
FIG. 4E is an exploded view corresponding to FIG. 4D.
Figure 4F:
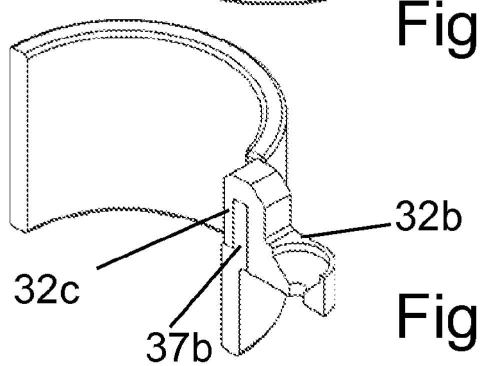
FIG. 4F is a sectional view of FIG. 4D.
Figure 6A:
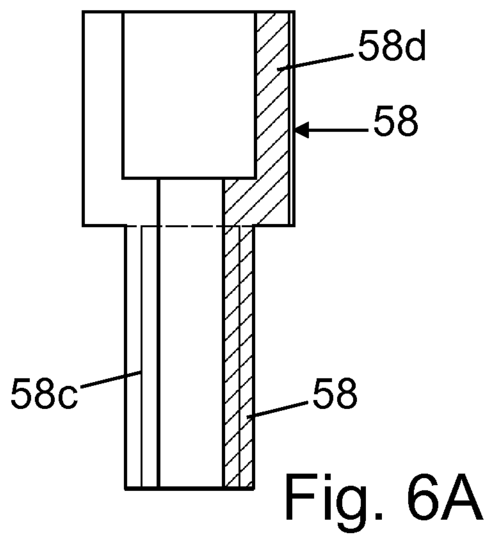
FIG. 6A is a section view of an adjustment screw of the fixing device.
Figure 6B:
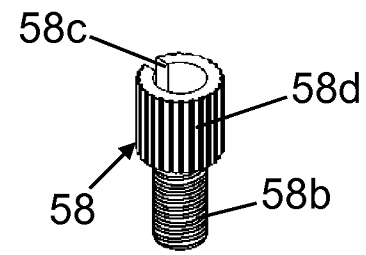
FIG. 6B is a perspective view of the adjustment screw of FIG. 6A.
Figure 6C:
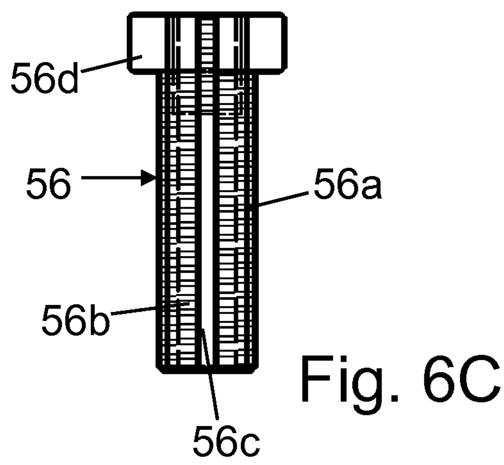
FIG. 6C is a section view of a fixing screw of the fixing device.
Figure 6D:
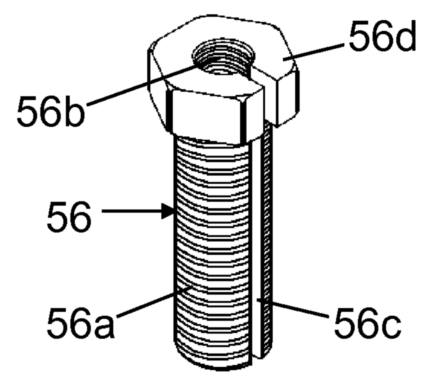
FIG. 6D is a perspective view of the fixing screw of FIG. 6C.
Figure 6E:
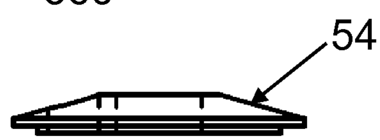
FIG. 6E is a side view of a cap of the fixing device.
Figure 6F:
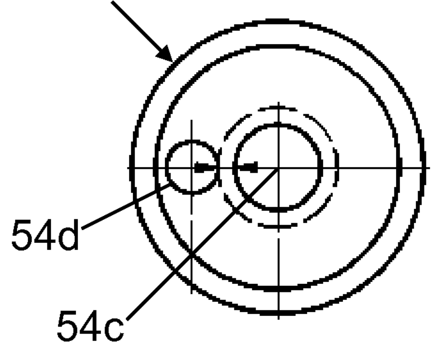
FIG. 6F is a top view of the cap of FIG. 6E.
Figure 6G:
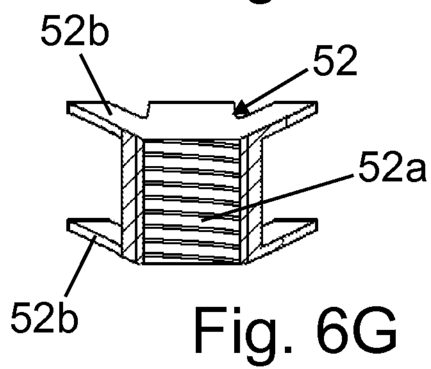
FIG. 6G is a section view of a star grip nut of the fixing device along the line VI-VI in FIG. 6H.
Figure 6H:
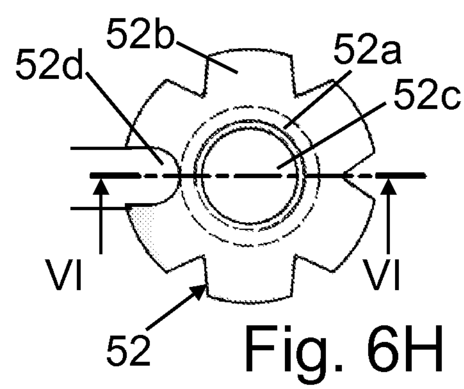
FIG. 6H is a top view on the star grip nut of FIG. 6G.

The sleeve of the second Bowden cable 32 is supported on the head tube 21 preferably in the area of the head tube opening 21*a*. For the support at the outside of the head tube 21 an appropriate stopper 21*c* can be applied, for example by means of screwing, as for example disclosed in FIG. 4A the WO 2012/005610 A2, or by welding. This stopper 21*c* can be positioned in such a way that, at the same time, it also forms a stopper for the connecting element 32*b* in the lowest position of the connecting element 32*b*. Alternatively, the core 32*a* of the second Bowden cable 32 can also be deflected, so that the stopper for example may also be provided inside a tube (of the frame 3), within which the second Bowden cable 32 runs. If appropriate, the tube inlet, through which the core 32*a* is introduced into the tube guiding to the rotor unit 30, can form the stopper itself, i.e. the core 32*a* runs over a long distance freely inside the corresponding (frame) tube. With an appropriate prestressing in all working conditions, the stopper can also be mounted at the housing like the connecting element, e. g. at the head tube 21, or frame 3 of the bicycle 1, i.e. in particular applied form-fittingly on it rather than screwed.

For fastening the stem 14 at the fork steerer 12, a fixing device 50 is provided. The stem 14 is pushed on the fork steerer 12 until it—if necessary interposing a ring—is seated on the upper headset 23. The multi-component fixing device 50 comprises, as a part, a star grip nut 52, which is arranged at the upper end of the fork steerer 12 inside it. The star grip nut 52 comprises a hollow-cylindrical base body with an internal thread 52*a* and (in the present case each time six) radially distanced star grip nut arms 52*b* at both ends (on top and at the bottom). he star grip nut 52 is hammered into the fork steerer 12 so that it is firmly connected to it. The star grip nut internal thread 52*a*, being concentric with the fork steerer 12, defines a central star grip nut passage 52*c*. Unlike known star grip nuts, the present star grip nut 52 comprises an eccentric star grip nut passage 52*d* on top and at the bottom between two adjacent arms 52.

As further part of the fixing device 50, a cap 54 is provided, which has the form of a plate and is put at the top of the stem 14. A centrally arranged centric cap opening 54*c* of the cap 54 aligns with the central star grip nut passage 52*c*, whereas an eccentric cap opening 52*d* aligns with the eccentric star grip nut passage 52*d*.

A fixing screw 56 as third part of the fixing device 50 has a fixing screw external thread 56*a*, a fixing screw internal thread 56*b*, a fixing screw longitudinal groove 56*c* and, at the upper end, a fixing screw head 56*d*, in the present case designed as a polygon. The hollow fixing screw 56 is screwed through the cap 54 at the cap opening 54*c* into the star grip nut 52, i.e. with the fixing screws external thread 56*a* into the star grip nut internal thread 52*a*. In this way the fixing screw 56 tenses the stem 14 against the upper headset 23.

As fourth part of the fixing device 50 an adjustment screw 58 is provided. The hollow adjustment screw 58 has an adjustment screw external thread 58*b*, an adjustment screw longitudinal groove 58*c*, and an—in the present case corrugated—adjustment screw head 58*d*. The adjustment screw 58 is screwed into the fixing screw 56, i.e. with the adjustment screw external thread 58*b* into the fixing screw internal thread 56*b*. Adjustment screw 58, fixing screw 56 and star grip nut 52 are thus concentric with each other and arranged towards the fork steerer 12.

The first Bowden cable 31 is guided from the handlebar 18 to the fixing device 50, where its sleeve is supported by the adjustment screw 58, whereas its core 31 is guided through the hollow adjustment screw 58—and thus also through the hollow fixing screw 56, the centric cap opening 54*c* and the central star grip nut passage 52*c*-into the fork steerer 12 up to the bar 42. The relative position of adjustment screw 58 and fixing screw 56 generates a tension in the first Bowden cable 31. In order to introduce the core 31*a* also with nipples at both ends into the hollow screws 56 and 58, the adjustment screw longitudinal slot 58*c* and the fixing screw slot 56*c* are provided, through which the core 31*a* of the first Bowden cable 31 can be introduced laterally into the screws 58 and 56. Useful care is taken to ensure that, in case of mounted fixing device 50, the longitudinal slots 56*c* and 58*c* are not congruent, in order to prevent an excessive lateral buckling of the core 31*a*.

The third Bowden cable 33, which is centrally guided instead of the first Bowden cable 31 in known fixing devices, is eccentrically guided in the present fixing device. I.e., the third Bowden cable 33 is guided through the eccentric cap opening 54*d* and the eccentric star grip nut passage 52*d* into the fork steerer 12 up to the front brake.

A modified fixing device 50 consists of the adjustment screw 58 and of a modified fixing screw 56'. The modified fixing screw 56' comprises a larger diameter and is screwed by means of its external thread directly into the fork steerer, in which for this purpose an internal thread was cut. The modified fixing screw 56' comprises a fixing screw internal thread 56*b*, in which the hollow adjustment screw 58 is screwed. The guiding of the core 31*a* of the first Bowden cable 31 is done as described before. The third Bowden cable 33 is guided through an eccentric passage (in the present case with a kidney-shaped cross-section) into the fork steerer 12.

For the assembly of the fork 8, in a first step, the star grip nut 52 is hammered into the fork steerer 12. In a second step, the first Bowden cable 31 (with bar 42) is pushed upwards from the bottom through the fork steerer 12 and through the star grip nut 42, while the bar 42 is tilted relatively to the core 31*a* of the first Bowden cable 31 when it arrives in the fork steerer 12. In a third step, the bar 42 (simultaneously tilting back relatively to the core 31*a*) is put with its ends through the fork steerer openings 12*a* so that the bar 42 is in the correct position. In a fourth step, the rotor unit 30 is pushed from above onto the fork steerer 12, until the bar 42 is engaged in the first transmission element 36. The preassembled unit obtained in this way is then, during installation of the whole bicycle 1, in a fifth step, pushed into the head tube 21. In a sixth step, the stem 14 is set up and the fixing device 50 completed, i.e. by tightening the fixing screw 56, the fork 8 is fixed (clamped). In a seventh step, the second Bowden cable 32 with the connecting element 32*b* is fixed at the connection area of the second transmission element 37, for which purpose the connecting element 32*b* is introduced through the head tube opening 21, and suspended (and/or clipped) in the way described above.

The fixing device 50 according to the invention is particularly conceived for forks 8 whose fork steerer 12 finishes with a diameter of 1⅛" (28.6 mm). However, forks are also known whose fork steerer finishes with a diameter of 1" (25.4 mm) and can have a thread outside. The fixing device known for this purpose, which also could be used in the present case alternatively to the fixing device 50, consists of a steerer stem which is thickened at its upper end so that the stem 14 can be pressed or clamped onto the steerer stem (I. e. on its top). At its lower end, the steerer stem is slanted (as a cylinder cut). The steerer stem is penetrated along its length by an adjustment screw, which extends centrally in axial direction and is accessible from the top. By means of this adjustment screw, the two sections of the steerer stem are displaceable in relation to each other, i.e. along the tilted cut surface. Introduced into the fork steerer 12, the two sections of the steerer stem can be supported by the inner wall of the fork steerer 12 and be clamped mutually. In this way, the stem 14 is fixed at the fork steerer 12. The optionally present thread outside on the fork steerer 12 serves to bias, by means of a union nut, the upper headset 25 in axial direction and to keep together its components. In order to be able to introduce also the third Bowden cable 33 into the fork steerer 12, the steerer stem preferably comprises an additional opening, for example besides the head of the adjustment screw.

Figure 7A:
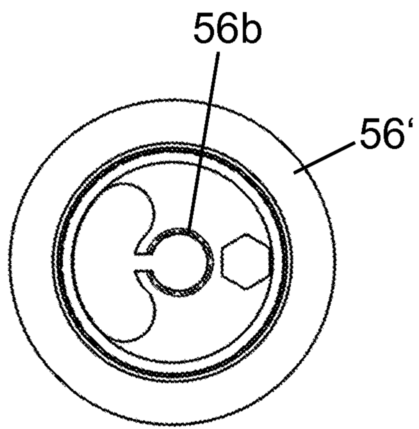
FIG. 7A is a top view of a modified fixing device.
Figure 7B:
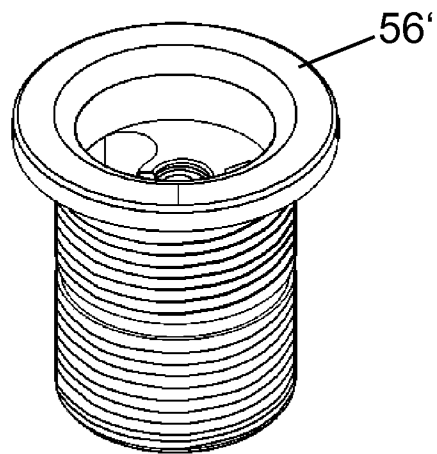
FIG. 7B is a perspective view of the fixing device of FIG. 7A.
Figure 7C:
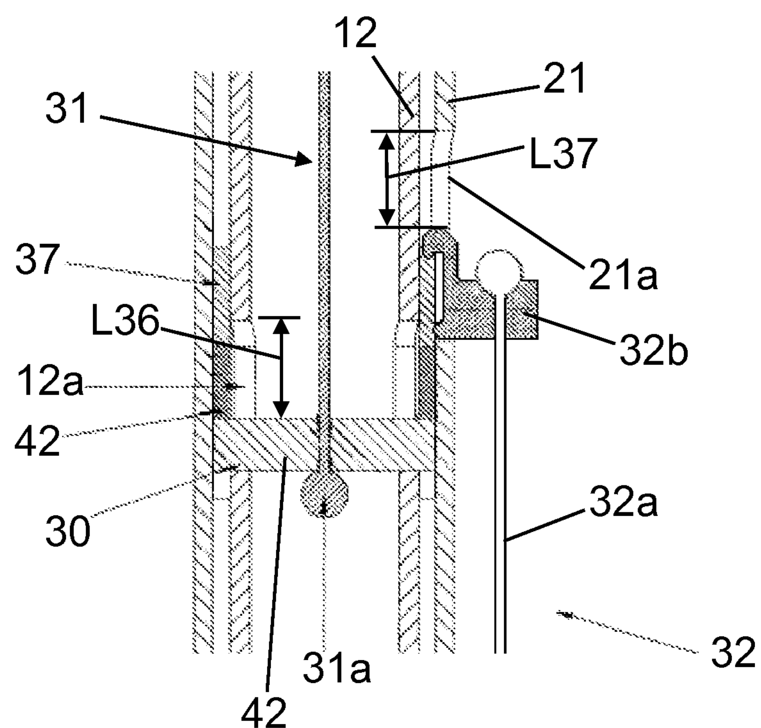
FIG. 7C is a section view in the area of the bearing of the fork with a rotor unit according to a second embodiment.

The second embodiment (FIG. 7C) coincides with the first embodiment, unless otherwise described in the following. Here too, the core 31*a* of the first Bowden cable 31 extends inside the fork steerer 12; the introduction into the fork steerer 12 can occur at any location, in principle, for example through the stem or directly from the brake levers at the handlebar, preferably with the above described fixing device 50 (or the alternative, known fixing device). At the end of the core 31*a*, in the present case, a bar 42 in plastic material is molded in one piece. In the present case, the production of the corresponding Bowden cable is done by introducing the core into the sleeve, afterwards at one end the bar 42 and at the other end (not shown) a nipple are molded for the brake lever, so that the core 31*a* can no longer be removed from the sleeve without destruction of the bar 42 or of the nipple, which has great advantages with regard to production. However, bar 42 and core 31*a* can also be separately formed—as in the first embodiment —, i.e. the core 31*a* can be introduced, for example, into an opening provided in the bar 42 and be clamped with it.

The sleeve-shaped first transmission element 36 is displaceable in axial direction on the fork steerer 12. The ends of the bar 42 protrude through oblong-hole-shaped fork steerer openings 12*a* in radial direction something beyond the outer circumference of the fork steerer 12 and are incorporated in downwards open slots of the first transmission element 36. Two downwards open slots facilitate the assembly. In principle, however, a slot or oblong hole is also possible in connection with an opening adapted to the form of the bar 42 on the opposite side or two openings adapted to the form of the bar 42. When the bar 42 is at the lower end of the fork steerer opening 12*a*, the free area above the upper side of the bar 42 and the upper end of the fork steerer opening 12*a* has a length L36.

With the first transmission element 36, the second transmission element 37 cooperates, which in the present case is formed by a displaceable ring placed directly on the fork steerer 12 above the first transmission element 36 with the connection area 37*b*. The connection area 37*b* and the connecting element 32*b* are formed as described above.

In the present case, the connecting element 32*b* protrudes through a head tube opening 21*a* towards outside the head tube 21, i.e. the core 32*a* of the second Bowden cable 32*a* in the present case also extends outside the head tube 21. The head tube opening 21*a* is, in the present case, oblong-hole-shaped, and in the non-operated state of the Bowden cables 31, 32 the distance between the upper side of the connecting element 32*b* inside the head tube opening 21*a* and the upper end of the head tube opening 21*a*, thus the free area in the head tube opening 21*a*, is designated with L37. As to the aforementioned length L36, in the present case L37 is maximally equal ample (preferably slightly greater than L36), i.e. the fork steerer opening 12*a* serves as safety limit for the maximum shift of the transmission elements 36, 37, so that the connecting element 32*a* is not damaged by forces from the top. On the other hand, in case of a definition of L44 equal L55, it can be ensured additionally that in the case of a design of the connecting element 32*b* with a jut 32*c* to be introduced into a seat of the connection area 37*b*, the connecting element 32*b* is completely introduced. The different or same lengths L44 and L55 can be realized also in the first embodiment similarly and with equal function. The support of the sleeve of the second Bowden cable 32 is done as in the first embodiment.

Figure 8:
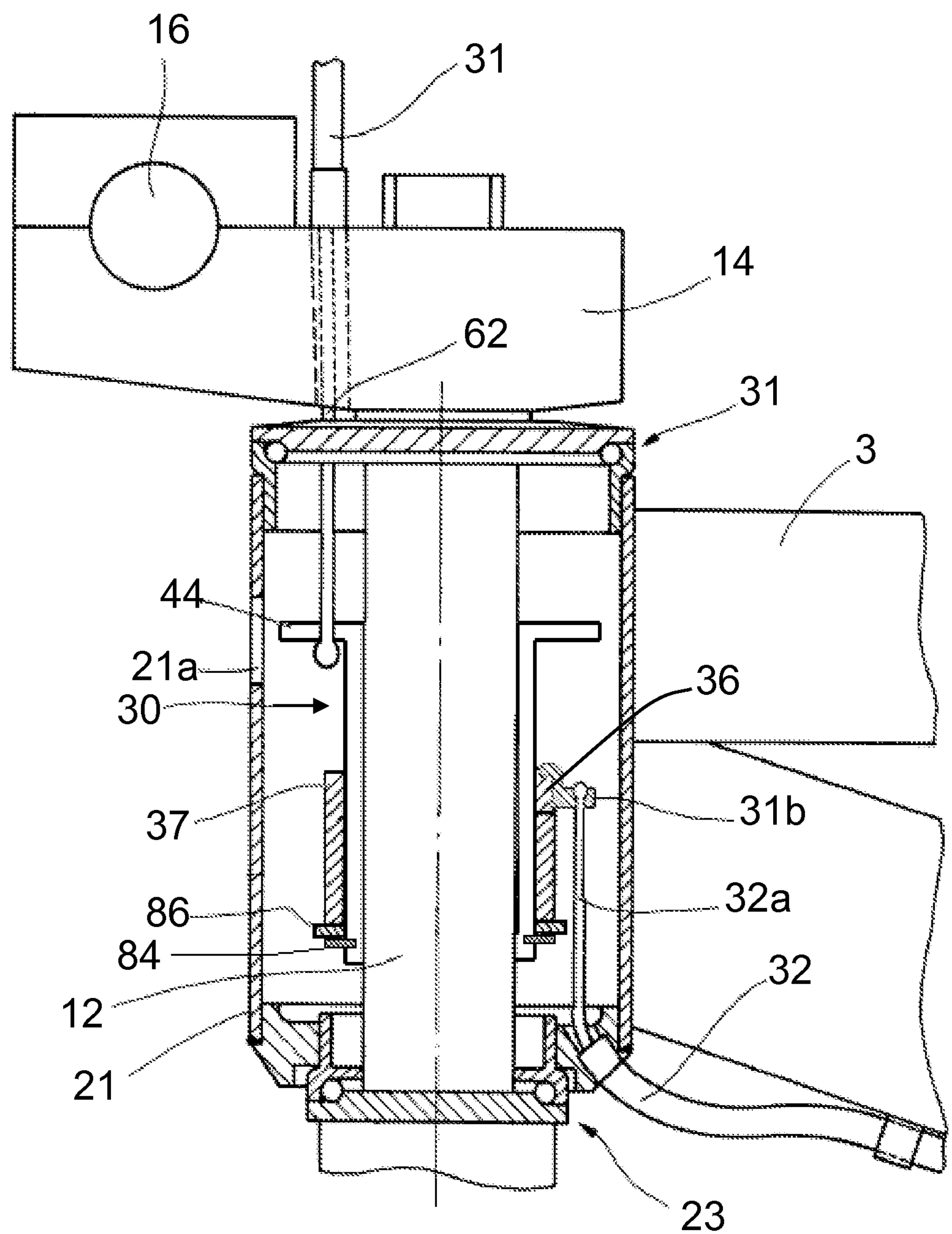
FIG. 8 is a section view in the area of the bearing of the fork with a rotor unit according to a third embodiment.

In the third embodiment (FIG. 8) the rotor unit 30 and the first Bowden cable 31 are arranged completely outside of the fork steerer 12, in a similar manner to how it is already disclosed in DE 199 29 093 C2.

The first transmission element 36 generally consists of a sleeve that, with small backlash, embeds the fork steerer 12, and whose top is one-piece with a ring-shaped flange extending outwards. By means of a sliding bearing, the first transmission element 36 embedding the fork steerer 12 is mounted smoothly on the fork steerer 12 which, in the present case, consists of polished steel. The first transmission element 36 is, in the present case, injection molded in plastic material. At the lower end of the sleeve, a groove is formed, in which a holding element 84 is incorporated in the form of an elastic ring. Above the holding element 84, a washer 86 is placed.

Between the flange of the first transmission element 36 and the washer 86, the second transmission element 37 is arranged on the sleeve. The second transmission element 37 generally consists of a ring, which also is injection molded in plastic material. The sleeve in this area has a continuous cylinder-shaped smooth outside so that the ring is easily rotatable relatively to the sleeve. The second transmission element 37 at its upper edge in the present case on one side comprises the connection area 37*b*. In axial direction, the second transmission element 55 together with the other parts of the rotor unit 30 is arranged in a displaceable way on the fork steerer 12, however immovably as to the first transmission element 36 due to prestressing of the Bowden cables 31, 32. For the two transmission elements 36, 37, the head tube 21 forms a housing, which offers protection in radial direction (with respect to the turn of the transmission elements 36, 37). As shown in the drawing, the head tube 21 forms a part of the frame 3.

The sleeve of the first Bowden cable 31 is fixed by means of a threaded joint at the stem 14 on its upper side, whereas the core 31*a* of the first Bowden cable 31 is guided through a vertical hole of the stem 14 on its bottom. Through an opening in the upper headset 25, the core 31*a* is guided into the interior of the head tube 21 and connected with the flange of the first transmission element 36, in the present case directly suspended in a slot in the flange. The flange corresponds in its transfer function to the above described bar 42. The connecting area is accessible from the outside preferably through a, for example, oval head tube opening 21*a* in the head tube 21. The head tube opening 21*a* is covered preferably by a (not represented) cap. The head tube opening 21*a* also can be formed differently, moreover it does not have to be arranged necessarily in the front, at the control ear 21, but for example also laterally.

The second Bowden cable 32 is supported with its sleeve by the head tube 21 or in the present case by an adapter piece between lower headset 23 and head tube 21, whereas the core 32*a* of the second Bowden cable 32 is guided through an opening in the lower headset 23 or in said adapter piece into the interior of the head tube 21. As described above, the core 32*a* of the second Bowden cable is connected by means of a connecting element 32*b* with a connection area 37*b* of the second transmission element 37. For a simple assembly of the connection element 32*b* and the core 32*a* of the second Bowden cable 32, the head tube opening 21*a* can be far greater and extend on one side laterally over the head tube 21. However also a second opening at a suitable location can be provided.

The third Bowden cable 33 for the front brake is pulled through a channel not represented in the drawing in the hollow fork steerer 12. If with only one brake lever the rear wheel brake and the front brake are to be actuated at the same time, at the rotor unit 30 in an appropriate way (i. e. by means of a further connecting element and of a connection area) the core of the third Bowden cable 33 can be fixed, which can be guided through the lower headset 23 to the front brake. The fastenings of the two second cores take place in the present case preferably displaced by 180° to each other. Obviously it is also possible to provide brake levers on either side of the handlebar, the function of the brakes being identical. In the present case, two cores are applied at the flange of the first transmission element 36.

Figure 9:
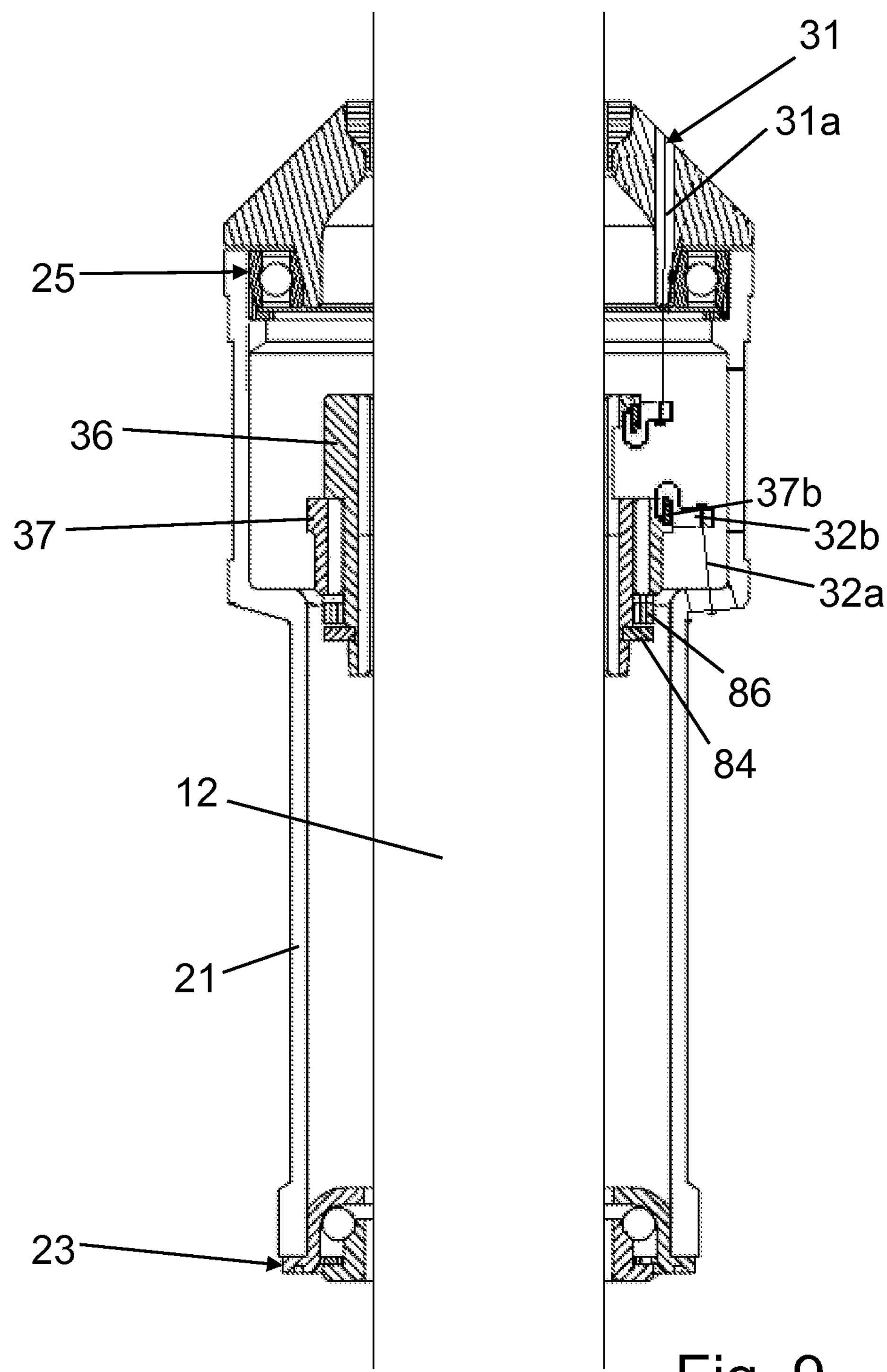
FIG. 9 is a section view in the area of the bearing of the fork with a rotor unit according to a modification of the third embodiment.

According to a modification (FIG. 9) of the third embodiment, the core 31*a* of the first Bowden cable 31 is also connected with the first transmission element 36 by means of a connecting element, which is formed for example like the connecting element 32*b* or its variants, and a connection area, which is suitably formed and with which the connecting element is connected. The first transmission element 36 comprises said connection area at its upper edge. Due to the prestressing of the core 31*a* of the first Bowden cable 31, both the core end in the connecting element (in case of a separate formation) and the connecting element in the connection area are engaged against gravity.

For reasons of precaution, it is pointed out that—for example when using two different Bowden cables for rear wheel brake and gear change—also a combination of two of the abovementioned rotor units (or a combination with a rotor unit arranged outside of the head tube 21) is possible, which are arranged axially one upon another. The combination of the rotor unit 30 of the third embodiment or its modification, which is arranged in the head tube 21 on top, with a rotor unit 30 of the first or second embodiment, which is arranged in the head tube 21 at the bottom, is preferred. Since the first Bowden cable 31 is guided to the lower rotor unit 30 inside the fork steerer 12 and that to the upper rotor unit 30 outside of the fork steerer 12, and since the two second Bowden cables 32 can be arranged at different places of the head tube 21, the two rotor units 30 do not obstruct each other in case of a rotation movement of the fork 8.

While specific embodiments of the invention have been shown and described in detail to illustrate the application of the principles of the invention, it will be understood that the invention may be embodied otherwise without departing from such principles.

The invention claimed is:

1. A rotor system for a bicycle for a bearing of a fork and for the transmission of actuations, the rotor system comprising:

Bowden cables each having a core, with at least a first transmission element and a second transmission element which are rotatable relative to one another and which are arranged in an area of the bearing of the fork, wherein the first transmission element and the second transmission element have at least a ring-shaped area, which is mounted on a fork steerer of the fork;

a connecting element; and a head tube at least surrounding the first transmission element and the second transmission element in a radial direction, wherein:

the first transmission element and the second transmission element have connection areas for the direct or indirect attachment of rotor side ends of the cores;

at least one of the first transmission element and the second transmission element comprises one of the connection areas arranged inside the head tube, the connecting element being form-fittingly attached at the one of the connection areas;

the connecting element interacts detachably with the rotor side end of the core assigned to at least one of the first transmission element and the second transmission element, or is connected in one piece to the rotor side end;

the core of one of the Bowden cables extends at least partially in the fork steerer, in which, at the rotor side end of the core, a bar is provided that protrudes through oblong-hole-shaped fork steerer openings in radial direction beyond the outer circumference of the fork steerer, and the ends of which are received by the first transmission element, in particular by means of grooves; and the bar during installation is tiltable relatively to the core of the one of the Bowden cables.

2. The rotor system according to claim 1, wherein the connecting element comprises at least one of:

a jut, which interacts with a guide groove as said one of the connection areas of the at least one transmission element, extending in an axial direction of the fork steerer;

two juts, which under elastic deformation in undercut areas of the at least one transmission element have a clip engagement in the connection area, in which for the clip engagement an elastic deformation of the connecting element is provided, and/or that the connecting element can be connected with said one of the connection areas of the at least one transmission element.

3. A rotor system according to claim 1, wherein:

the first transmission element and the second transmission element are partially arranged in alignment with each other and partially concentric with one another, by means of steps, and are in direct sliding contact with one another.

4. The rotor system according to claim 1, wherein at least one of:

the core of the one of the Bowden cables is connected with the first transmission element;

the core of another one of the Bowden cables is connected with the second transmission element; and the first transmission element and/or the second transmission element is a plastic injection molded part.

5. The rotor system according to claim 1, wherein the bar has catches, by means of which it during the introduction into the first transmission element is locked in position.

6. The rotor system according to claim 1, wherein each Bowden cable comprises a sleeve, wherein the connecting element is pressed with an end of the core or is molded or cast or connected in one piece in another way to the end of the core, or a bar is mounted on the core between the end of the core and the sleeve of the one of the Bowden cables, the bar being tiltable relatively to the core.

7. The rotor system according to claim 1, further comprising a bearing cup of a headset, by means of which the fork is mounted in the head tube, in which the bearing cup is connected firmly with the head tube, wherein the bearing cup at a narrowest location comprises an internal diameter of 36.0±0.2 mm.

8. The rotor system according to claim 1, further comprising a fixing device for fastening a stem at the fork steerer, wherein the one of the Bowden cables, having the core that is applied at the first transmission element, and another one of the Bowden cables, which is provided for transmitting brake actuations to a front wheel, through two passages in a star grip nut or a fixing screw are introduced into the fork steerer, in which one of the two passages is centric and the other eccentric.

9. A bicycle comprising a rotor system for a transmission of brake actuations from a handlebar or handlebar region to a rear wheel, the rotor system comprising:

Bowden cables each comprising a core and first transmission element and a second transmission element which are rotatable relative to one another and which are arranged in an area of the bearing of a fork, wherein the first transmission element and the second transmission element have at least a ring-shaped area, which is mounted on a fork steerer of the fork;

a connecting element; and a head tube at least surrounding the first transmission element and the second transmission element in a radial direction, wherein:

the first transmission element and the second transmission element have connection areas for the direct or indirect attachment of rotor side ends of the cores;

at least one of the first transmission element and the second transmission element comprises one of the connection areas arranged inside the head tube, the connecting element being form-fittingly attached at the one of the connection areas;

the connecting element interacts detachably with the rotor side end of the core assigned to at least one of the first transmission element and the second transmission element, or is connected in one piece to the rotor side end; and the core of one of the Bowden cables extends at least partially in the fork steerer, in which, at the rotor side end of the core, a bar is provided that protrudes through oblong-hole-shaped fork steerer openings in radial direction beyond the outer circumference of the fork steerer, and the ends of which are received by the first transmission element, in particular by means of grooves.

10. The bicycle according to claim 9, wherein the connecting element comprises at least one of:

a jut, which interacts with a guide groove as said one of the connection areas of the at least one transmission element, extending in an axial direction of the fork steerer, or that the connecting element;

two juts, which under elastic deformation in undercut areas of the at least one transmission element have a clip engagement in the connection area, in which for the clip engagement an elastic deformation of the connecting element is provided, and/or that the connecting element can be connected with said one of the connection areas of the at least one transmission element.

11. The bicycle according to claim 9, wherein the first transmission element and the second transmission element are partially arranged in alignment with each other and partially concentric with one another, by means of steps, and are in direct sliding contact with one another.

12. The bicycle according to claim 9, wherein at least one of:

the core of the one of the Bowden cables is connected with the first transmission element;

the core of another one of the Bowden cables is connected with the second transmission element; and the first transmission element and/or the second transmission element is a plastic injection molded part.

13. The bicycle according to claim 9, wherein one or more of:

the bar has catches, by means of which it during the introduction into the first transmission element is locked in position; and the bar during installation is tiltable relatively to the core of the one of the Bowden cables.

14. The bicycle according to claim 9, wherein each Bowden cable comprises a sleeve, wherein the connecting element is pressed with an end of the core or is molded or cast or connected in one piece in another way to the end of the core, or a bar is mounted on the core between the end of the core and the sleeve of the one of the Bowden cables, the bar being tiltable relatively to the core.

15. The bicycle according to claim 9, further comprising a bearing cup of a headset, by means of which the fork is mounted in the head tube, in which the bearing cup is connected firmly with the head tube, wherein the bearing cup at a narrowest location comprises an internal diameter of 36.0±0.2 mm.

16. The bicycle according to claim 9, further comprising a fixing device for fastening a stem at the fork steerer, wherein the one of the Bowden cables, having the core that is applied at the first transmission element, and another one of the Bowden cables, which is provided for transmitting brake actuations to a front wheel, through two passages in a star grip nut or a fixing screw are introduced into the fork steerer, in which one of the two passages is centric and the other eccentric.

17. A bicycle comprising a rotor system for a transmission of brake actuations from a handlebar or handlebar region to a rear wheel, the rotor system comprising:

Bowden cables each comprising a core and first and a second transmission element which are rotatable relative to one another and which are arranged in an area of the bearing of a fork, wherein the first transmission element and the second transmission element have at least a ring-shaped area, which is mounted on a fork steerer of the fork;

a connecting element; and a head tube at least surrounding the first transmission element and the second transmission element in a radial direction, wherein:

the first transmission element and the second transmission element have connection areas for the direct or indirect attachment of rotor side ends of the cores;

at least one of the first transmission element and the second transmission element comprises one of the connection areas arranged inside the head tube, the said connecting element being form-fittingly attached at the one of the connection areas;

the connecting element interacts detachably with the rotor side end of the core assigned to at least one of the first transmission element and the second transmission element, or is connected in one piece to the rotor side end; and each Bowden cable comprises a sleeve, wherein the connecting element is pressed with an end of the core or is molded or cast or connected in one piece in another way to the end of the core, or a bar is mounted on the core between the end of the core and the sleeve of one of the Bowden cables, the bar being tiltable relatively to the core.

18. A rotor system for a bicycle for a bearing of a fork and for the transmission of actuations, the rotor system comprising:

Bowden cables each having a core, with at least a first and a second transmission element which are rotatable relative to one another and which are arranged in an area of the bearing of the fork, wherein the first transmission element and the second transmission element have at least a ring-shaped area, which is mounted on a fork steerer of the fork;

a connecting element; and a head tube at least surrounding the first transmission element and the second transmission element in a radial direction, wherein:

the first transmission element and the second transmission element have connection areas for the direct or indirect attachment of rotor side ends of the cores;

at least one of the first transmission element and the second transmission element comprises one of the connection areas arranged inside the head tube, the said connecting element being form-fittingly attached at the one of the connection areas;

the connecting element interacts detachably with the rotor side end of the core assigned to at least one of the first transmission element and the second transmission element, or is connected in one piece to the rotor side end; and the core of the first Bowden cable extends at least sectionally in the fork steerer, in which, at the rotor side end of the core, a bar is provided that protrudes through oblong-hole-shaped fork steerer openings in radial direction beyond the outer circumference of the fork steerer, and the ends of which are received by the first transmission element, in particular by means of grooves.

19. The rotor system according to claim 18, wherein one or more of:

the bar has catches, by means of which it during the introduction into the first transmission element is locked in position; and the bar during installation is tiltable relatively to the core of the first Bowden cable.

20. A rotor system for a bicycle for a bearing of a fork and for the transmission of actuations, the rotor system comprising:

Bowden cables each having a core, with at least a first and a second transmission element which are rotatable relative to one another and which are arranged in an area of the bearing of the fork, wherein the first transmission element and the second transmission element have at least a ring-shaped area, which is mounted on a fork steerer of the fork;

a connecting element; and a head tube at least surrounding the first transmission element and the second transmission element in a radial direction, wherein:

the first transmission element and the second transmission element have connection areas for the direct or indirect attachment of rotor side ends of the cores;

at least one of the first transmission element and the second transmission element comprises one of the connection areas arranged inside the head tube, at which connection area the connecting element is form-fittingly attached;

the connecting element interacts detachably with the rotor side end of the core assigned to at least one of the first transmission element and the second transmission element, or is connected in one piece to the rotor side end; and each Bowden cable comprises a sleeve, wherein the connecting element is pressed with an end of the core or is molded or cast or connected in one piece in another way to the end of the core, or a bar is mounted on the core between the end of the core and the sleeve of one of the Bowden cables, the bar being tiltable relatively to the core.

* * * * *